(12) United States Patent
Mittermair et al.

(10) Patent No.: US 9,222,569 B2
(45) Date of Patent: Dec. 29, 2015

(54) TOOTHED WHEEL AND BACKLASH FREE GEAR TRAIN

(75) Inventors: Mario Mittermair, Ampflwang (AT); Franz Josef Gielesberger, Pettenbach (AT); Rudolf Spitzbart, Laakirchen (AT)

(73) Assignee: Miba Sinter Austria GmbH, Laakirchen (AT)

( * ) Notice: Subject to any disclaimer, the term of this patent is extended or adjusted under 35 U.S.C. 154(b) by 266 days.

(21) Appl. No.: 13/821,030

(22) PCT Filed: Sep. 23, 2011

(86) PCT No.: PCT/AT2011/050012
§ 371 (c)(1),
(2), (4) Date: Mar. 6, 2013

(87) PCT Pub. No.: WO2012/037593
PCT Pub. Date: Mar. 29, 2012

(65) Prior Publication Data
US 2013/0160589 A1    Jun. 27, 2013

(30) Foreign Application Priority Data

Sep. 24, 2010    (AT) ................................ A 1604/2010

(51) Int. Cl.
*F16H 55/18*    (2006.01)
*F16H 55/06*    (2006.01)
*F16H 55/16*    (2006.01)

(52) U.S. Cl.
CPC ............. *F16H 55/18* (2013.01); *F16H 55/06* (2013.01); *F16H 55/16* (2013.01); *Y10T 74/19623* (2015.01)

(58) Field of Classification Search
CPC ... Y10T 74/19623; F16H 55/06; F16H 55/18; F16H 55/16; F16H 55/08; F16H 2055/185
USPC ........... 74/409, 411, 440, 445, 446, 447, 461, 74/462, 443, 449; 29/893.37
See application file for complete search history.

(56) References Cited

U.S. PATENT DOCUMENTS 462,994 A  *  11/1891  Pfetch ............................. 74/443
1,613,702 A  *  1/1927  Hammar ......................... 74/462
(Continued)

FOREIGN PATENT DOCUMENTS

CN           101598212 A      12/2009
DE     102011016147 A1  *  10/2012
(Continued)

OTHER PUBLICATIONS

International Search Report of PCT/AT2011/050012, date of mailing Mar. 13, 2012.

*Primary Examiner* — William Kelleher
*Assistant Examiner* — Jude Agendia
(74) *Attorney, Agent, or Firm* — Collard & Roe, P.C.

(57) ABSTRACT

A toothed wheel has a sequence of X teeth, wherein each N-th tooth at least partially has a smaller tooth rigidity compared to the remaining X−N teeth, N being a number which is selected from a range with a lower limit of 2 and an upper limit of X, in particular X/2. Alternatively, a number of M teeth at least partially have a smaller tooth rigidity than the remaining X−M teeth, where M is selected from a range with a lower limit of 1 and an upper limit of X−1 or an upper limit of X provided that at least individual teeth are divided or all the teeth have a different geometry, and/or wherein the tooth system has a pitch in which each Nth tooth stands out compared to the remaining X−N teeth.

14 Claims, 7 Drawing Sheets

(56) References Cited

U.S. PATENT DOCUMENTS

| | | | | |
|---|---|---|---|---|
| 1,755,945 | A | * | 4/1930 | Alexandrescu ............... 74/440 |
| 1,772,986 | A | * | 8/1930 | Dunham ..................... 74/461 |
| 2,335,504 | A | * | 11/1943 | Gazda ........................ 74/462 |
| 2,764,034 | A | * | 9/1956 | Hotine ........................ 74/440 |
| 2,803,006 | A | * | 8/1957 | Jacobi ................... G01S 7/006 340/12.16 |
| 3,037,396 | A | * | 6/1962 | Martin ........................ 74/409 |
| 3,122,928 | A | * | 3/1964 | Paterson ......................... 74/2 |
| 3,193,936 | A | * | 7/1965 | Schnitzer .................... 33/379 |
| 3,206,997 | A | * | 9/1965 | Hardy ........................ 74/462 |
| 3,469,468 | A | * | 9/1969 | Cozzarin et al. ............. 474/161 |
| 3,535,948 | A | * | 10/1970 | Rychlik et al. ................. 74/440 |
| 3,636,792 | A | * | 1/1972 | Vigh .................... F16F 15/10 74/411 |
| 3,854,418 | A | * | 12/1974 | Bertin ................... B61B 13/04 104/23.2 |
| 4,437,356 | A | * | 3/1984 | Imazaike ............... F16H 55/06 74/411 |
| 4,911,032 | A | * | 3/1990 | Steele et al. ................. 74/462 |
| 5,596,905 | A | * | 1/1997 | Kurosawa ..................... 74/443 |
| 5,934,144 | A | * | 8/1999 | Marinkovic .................. 74/440 |
| 5,946,975 | A | * | 9/1999 | Yun ............................ 74/462 |
| 6,170,349 | B1 | * | 1/2001 | Tanaka et al. ................. 74/409 |
| 6,230,578 | B1 | * | 5/2001 | Kim et al. .................... 74/462 |
| 6,354,395 | B1 | * | 3/2002 | Cheng et al. ................. 180/444 |
| 6,561,945 | B2 | * | 5/2003 | Shattuck et al. ............. 475/331 |
| 6,826,975 | B2 | * | 12/2004 | Reguzzi ...................... 74/440 |
| 7,383,750 | B2 | * | 6/2008 | Menjak et al. ................ 74/409 |
| 8,201,471 | B2 | | 6/2012 | Ohmi et al. |
| 2002/0121152 | A1 | | 9/2002 | White et al. |
| 2003/0228950 | A1 | * | 12/2003 | Young ...................... 474/161 |
| 2004/0069086 | A1 | * | 4/2004 | Thoma ................... F16H 55/18 74/443 |
| 2004/0253912 | A1 | * | 12/2004 | Menjak .................. B23P 15/14 451/47 |
| 2005/0183531 | A1 | * | 8/2005 | Hagihara et al. ............... 74/440 |
| 2006/0166782 | A1 | * | 7/2006 | Bayer ..................... B62D 5/008 475/345 |
| 2007/0137355 | A1 | * | 6/2007 | Ohmi et al. .................. 74/462 |
| 2008/0141811 | A1 | | 6/2008 | Sandner |
| 2008/0163502 | A1 | * | 7/2008 | Siraky et al. .................. 33/1 PT |
| 2008/0289441 | A1 | * | 11/2008 | Schadow et al. ............. 74/459.5 |
| 2008/0307915 | A1 | * | 12/2008 | Scheufele ..................... 74/457 |
| 2010/0043578 | A1 | | 2/2010 | Daout |
| 2010/0242649 | A1 | * | 9/2010 | Vandewal ............... F16H 55/18 74/409 |
| 2011/0079098 | A1 | * | 4/2011 | Nowicki ....................... 74/411 |
| 2012/0024094 | A1 | * | 2/2012 | Sokolofsky et al. ........... 74/409 |

FOREIGN PATENT DOCUMENTS

| | | |
|---|---|---|
| EP | 1 477 708 | 11/2004 |
| EP | 1 770 308 | 4/2007 |
| FR | 2 803 006 | 6/2001 |
| JP | 57006155 | 1/1982 |
| JP | 2005 030449 | 2/2005 |
| WO | WO 2005/090830 | 9/2005 |

\* cited by examiner

PRIOR ART

TOOTHED WHEEL AND BACKLASH FREE GEAR TRAIN

CROSS REFERENCE TO RELATED APPLICATIONS

This application is the National Stage of PCT/AT2011/050012 filed on Sep. 23, 2011, which claims priority under 35 U.S.C. §119 of Austrian Application No. A 1604/2010 filed on Sep. 24, 2010, the disclosure of which is incorporated by reference. The international application under PCT article 21(2) was not published in English.

BACKGROUND OF THE INVENTION

The invention relates to a toothed wheel comprising a toothed wheel body with a tooth system comprising a sequence of teeth, wherein the total number of teeth has a value X, and a play-free gear train comprising two toothed wheels that mesh together.

Play-free gear trains are usually in the form of a toothed wheel arrangement, a so-called split gear. A toothed wheel arrangement of this kind is known for example from WO 2005/090830 A1 of the same Applicant, which comprises a toothed wheel for a play-free spur gear with a hub, a gear rim supported by the hub, which gear rim is divided along an axially normal dividing plane into two part rims, namely a rim part fixed to the hub and a rim ring mounted coaxially rotatably opposite the latter, and with an annular spring surrounding the hub, which is supported at its ends opposite one another in circumferential direction on support webs configured by the two part rims and overlapping one another in axial direction, which support webs are arranged behind one another in the circumferential direction of the gear rim. The support web of a part rim passes through the other part rim in an through opening with play in circumferential direction and forms the support web of the part rim with the through opening an assembly stop delimiting the through opening for the other support web. The rim ring is secured axially on the hub, for example by means of a snap ring.

SUMMARY OF THE INVENTION

On this basis the objective of the invention is to simplify said toothed wheel arrangement.

This objective is achieved on the one hand by the aforementioned toothed wheel, wherein each N-th tooth at least partly has a lower tooth rigidity than the remaining X–N teeth, wherein N is a number selected from a range with a lower limit of 2 and an upper limit of X, in particular X/2, or wherein a number of M teeth have at least partly a lower tooth rigidity than the remaining X–M teeth, wherein M is selected from a range with a lower limit of 1 and an upper limit of X–1 or an upper limit of X with the proviso that at least individual teeth are configured to be divided, and/or the toothing has a pitch such that every N-th tooth stands out from the remaining X–N teeth, and on the other hand by means of the play-free gear train, in which one of the toothed wheels is configured according to the invention.

The term "at least partly" means that the teeth of the toothed wheel can also be configured to be divided for example, divided in two, wherein part of the respective tooth has lower tooth rigidity than the remaining part of the tooth.

It is an advantage here that the functionality of prestressing by annular springs, i.e. so-called Ω-springs, is introduced into the toothed wheel itself, whereby the structural design and thereby the assembly of the gear train can be simplified compared to the toothed wheel arrangement according to the prior art. In this way a reduction in cost can be achieved compared to the toothed wheel arrangement of the prior art. In addition, the wear of the toothed wheel can be reduced compared to the toothed wheel arrangement according to the prior art, as for the pretensioning or clearance-free position no rotatable toothed wheel is required to be rotated during operation relative to the main toothed wheel. A further advantage that can be achieved by the toothed wheel according to the invention is that the latter can also be used as an intermediate wheel between two further toothed wheels, wherein the torsional flank clearance with both meshing toothing pairs can be minimized or eliminated by the intermediate gear. This cannot be achieved by means of the toothed wheel arrangement according to the prior art, as the prestressing can be adjusted by the Ω-spring only to tooth flank clearance.

According to one embodiment variant every N-th tooth or the M teeth is or are made from a material which has a lower modulus of elasticity than the material of the remaining X–N teeth or X–M teeth. In this way a structurally simple possibility of bending the N-th teeth for no-clearance is provided during engagement with a toothing, as in this way all of the teeth of the tooth system of the toothed wheel can remain unchanged with respect to their tooth geometry.

Furthermore, it is also possible that for the bendability of the N-th or M teeth a maximum tooth width of every N-th tooth or the M teeth, as viewed in axial direction, is smaller than a maximum tooth width of the remaining N-X teeth or X–M teeth in the same direction. By means of this configuration the individual tooth geometries can be taken into consideration at the production stage of the toothed wheel body with the tooth system, particularly if the toothed wheel is produced according to a sintering method in which a suitable press mold can be used.

Every N-th tooth or the M teeth can be made at least partly from a material that is different from the remaining X–N teeth or X–M teeth. In this way an embodiment of the toothed wheel is possible in which the bendable teeth are not weakened or are weakened to a minimum degree, in that their tooth profile is adapted accordingly, and yet the elimination of play is still achieved.

According to one embodiment variant, every N-th tooth or the M teeth is or are formed at least partly by a sheet metal element, which is or are connected to the toothed wheel body. The sheet metal elements have the advantage that they can be produced to be relatively thin, but are still sufficiently strong for a long lifetime of the toothed wheel. In addition, the sheet metal elements can be shaped without much effort into the desired form for bendability. By having thin teeth the advantage is that with the teeth at the set axial distance between the toothed wheels and tensioning with the mating wheel at the same time by the larger tooth gap, which is created by the use of sheet metal elements, also run-out errors of toothed wheels can be accommodated better without the teeth of the two tooth systems getting jammed. In other words in this way the requirements for the dimensional accuracy of the toothed wheel can be reduced without affecting its functionality.

However, it is also possible that every N-th tooth or the M teeth is or are made at least partly of plastic, so that the teeth can be produced easily, for example by injection molding, whereby a corresponding reduction in cost can be achieved.

Preferably, the N-th teeth or the M teeth made of a different material from the material of the remaining X–N teeth or X–M teeth have a common insert element, wherein said insert element is connected to the toothed wheel body, wherein if necessary the toothed wheel body has a groove in an end face and the insert element is arranged at least partly in the groove.

In this way handling during the assembly of the toothed wheel is simplified. By means of the arrangement of the groove also the material bonding can be improved, whereby the risk of detachment of individual teeth is reduced during operation. In addition, the groove also has the advantage of providing a simpler fitting of the insert element into the toothed wheel body.

According to one embodiment variant the teeth of the insert element are arranged offset to the X–N teeth or X–M teeth of the tooth system of the toothed wheel body with the formation of an uneven pitch. In this way the effect of the elimination of clearance is supported by the bendability of the N-th teeth, so that the bendability can be reduced and in this way the N-th teeth can be made from a more bending-resistant material, thereby improving the mechanical loadability of the toothed wheel.

However, it is also possible that every N-th tooth or the M teeth has or have a different tooth geometry from the remaining X–N teeth or X–M teeth, in order in this way to influence the bendability and covering with the teeth of the meshing mating gear during engagement with the tooth system.

BRIEF DESCRIPTION OF THE DRAWINGS

For a better understanding of the invention the latter is explained in more detail with reference to the following Figures.

In a schematically simplified view.

DETAILED DESCRIPTION OF THE EMBODIMENTS

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIGS. 1 to 5 show a first embodiment variant of a toothed wheel 1. The toothed wheel 1 comprises a toothed wheel body 2, which on its radially outer circumferential surface has a tooth system 3 consisting of teeth 4. The total number of teeth 4 is denoted within the meaning of the invention by X. The absolute value of teeth 4 is dependent on the size of the toothed wheel, i.e. its diameter, and on the tooth size and the tooth geometry, which is selected as a function of the application of the toothed wheel 1. As this is known from the prior art, reference is made to the relevant literature.

The toothed wheel body 2 with the teeth 4 is preferably produced at least partly by a sintering method, and is made in particular from sintered steel, whereby also other materials such as bronzes or brass can be used or the toothed wheel body and the teeth 4 can be made at least partly from a solid material, for example by casting.

In the shown embodiment of the toothed wheel 1 every second tooth 4 is shorter in axial direction than a toothing width 5 of the tooth system 3 in the same direction. In general, every N-th tooth 4 can be configured to be shorter in axial direction than the remaining X–N teeth 4. Both the longer and the shorter teeth 4 are preferably made from the same material, in particular in one piece with the toothed wheel body 2. In this case all of the teeth 4 made from this material in this embodiment variant of the toothed wheel 1 have the same profile.

The gap created by the shorter teeth 4 in axial direction over the course of the teeth 4 is at least partly filled with a second material, in the form of the tooth profile of the teeth 4. In this way a "whole tooth" is formed which has a toothing width 5, which corresponds at least approximately to that of the remaining X–N teeth 4, i.e. in this embodiment variant of the toothing width 5 of the teeth 4 immediately adjacent to the shortened teeth 4. However, in principle it is also possible that said teeth 4 composed of two part teeth 6, 7 are also shorter or longer in axial direction than the remaining X–N teeth 4.

The part teeth 7 made from the second material thereby have a lower tooth rigidity than the remaining X–N teeth under the same environmental conditions.

The additional material for the N part teeth 7 can in particular be a plastic, for example a PA, a PPS, a PEEK, a PET, a PE, a UHMW-PE, a PTFE, etc. Preferably, the plastics used can also be fiber-reinforced, for example by glass or carbon fibers. The plastic should be able to withstand the mechanical stress of the teeth 4 during meshing engagement with the tooth system of a mating gear. The additional material can however also be a metal or a metal alloy, for example a non-ferrous metal Al, Cu or bronze.

Figure 1:
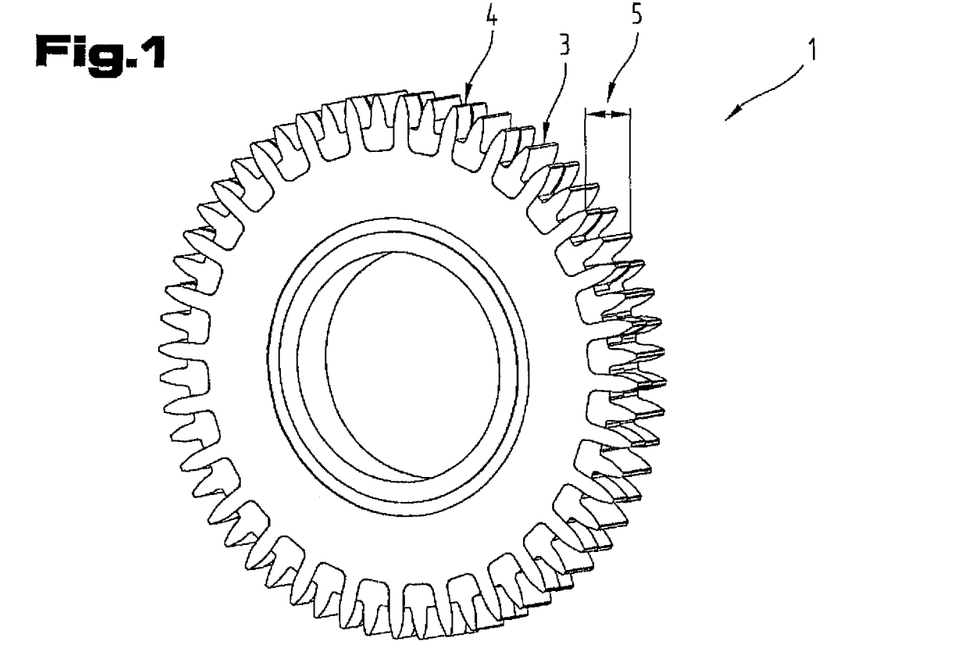
FIG. 1 shows a first embodiment variant of a toothed wheel in oblique view.
Figure 2:
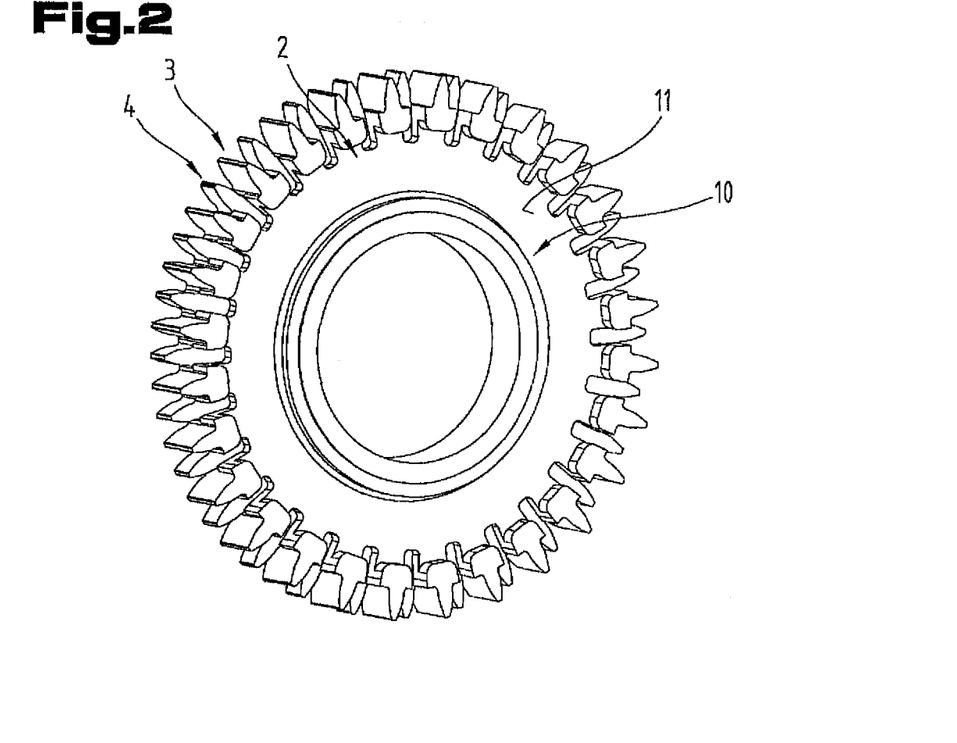
FIG. 2 shows the toothed wheel body of the toothed wheel according to FIG. 1 in oblique view.
Figure 3:
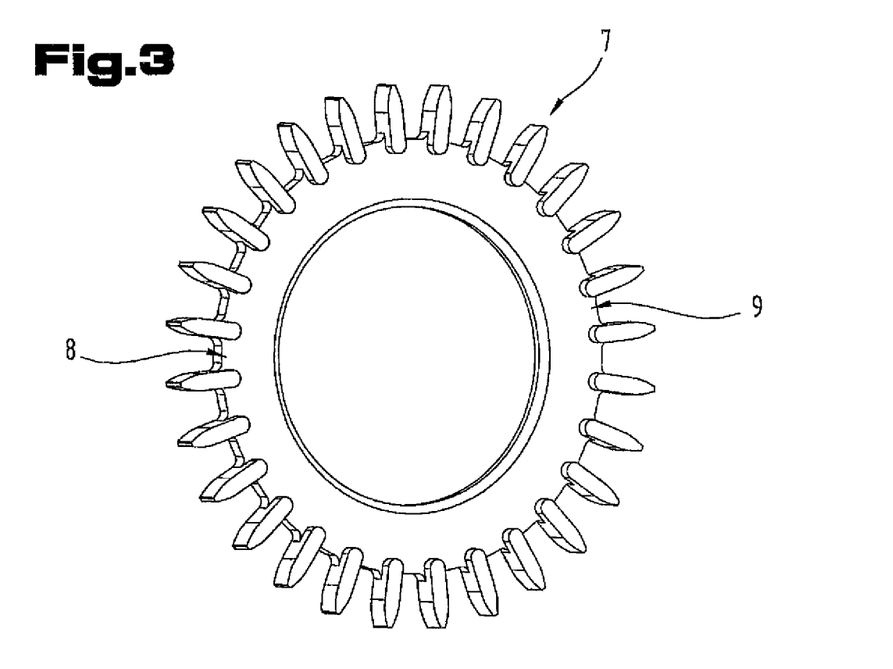
FIG. 3 shows the insert element of the toothed wheel according to FIG. 1 in oblique view.
Figure 5:
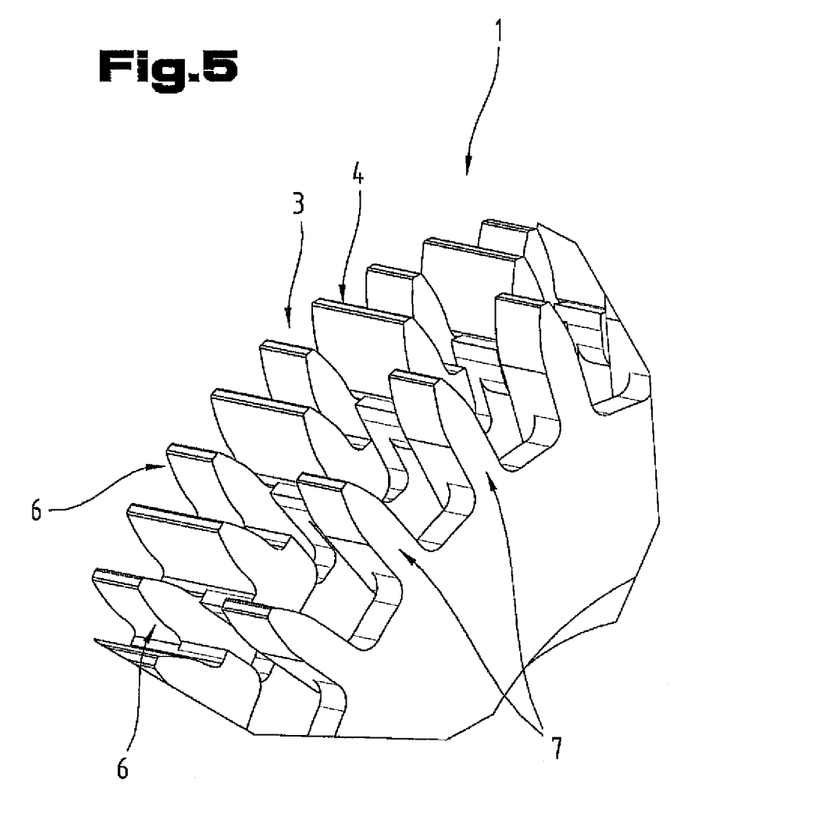
FIG. 5 shows a detail of the toothed wheel according to FIG. 1 in the area of the toothing in oblique view.

In principle, it is possible that the part teeth 7 are attached individually to the toothed wheel body 2, for example by direct injection or inserting into recesses of the toothed wheel body provided in particular with an undercut, wherein the teeth can preferably have a form that is complementary to the recess, and/or by adhesion to the toothed wheel body. In the preferred embodiment of the invention at least a plurality, preferably all, part teeth form an insert element 8. An insert element 8 of this kind is shown in FIG. 3. Said insert element 8 has an annular body 9, on the outer circumference of which the part teeth 7 are arranged, which together with the part teeth 6 of the toothed wheel body 2, as shown in FIG. 2, form respectively a whole second tooth 4, or expressed in general terms a whole N-th tooth 4. For better clarification FIG. 5 shows an explosive view of a cut-out of the tooth system 3 of the toothed wheel 1.

It should be mentioned that preferably all of the part teeth 7 form a single, one-piece insert element 8 produced for example by injection molding, however, it is also possible within the scope of the invention to provide a plurality of part insert elements which comprise only a portion of the part teeth 7, for example 50% or 25%.

It should also be mentioned that the annular body 9 of the insert element 8 need not necessarily be configured to be circular, but also other geometric forms are possible, such as e.g. a square or a hexagon or octagon, although the circular form has advantages and is therefore preferred.

Figure 4:
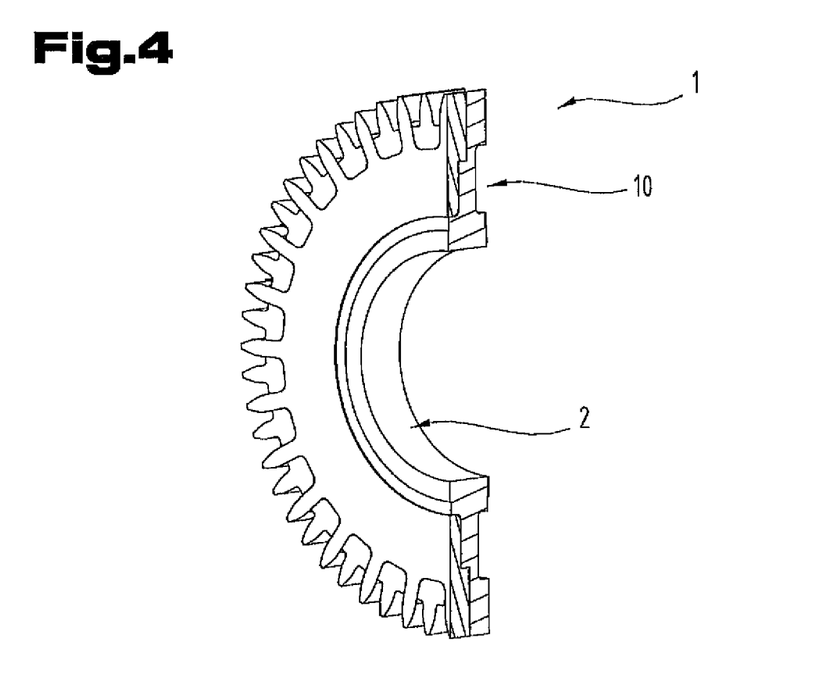
FIG. 4 shows a cross section of the toothed wheel according to FIG. 1 in oblique view.

In the preferred embodiment of the toothed wheel 1 according to this embodiment variant the toothed wheel body 2 of the toothed wheel 1 has an annular groove 10 or a depression in an end face 11 in axial direction in which the insert element 8, i.e. the ring element 9 is arranged and is connected to the toothed wheel body 2, as shown in FIGS. 2 and 4. In this way not only is a better connection of the insert element 8 to the toothed wheel body 2 achieved, but also the insert element 8 can be configured with a greater wall thickness—as viewed in axial direction-, whereby its mechanical stressability can be increased. This is an advantage in that the insert element 8 can be arranged not projecting in axial direction on the toothed wheel body 2.

In principle, the insert element 8 can be a separate component. However, it is also possible for the insert element to be injected onto the toothed wheel body.

As shown in FIGS. 3 and 4, it is also possible that the part teeth 7 in axial direction have a greater thickness than the annular body. In this way it is possible that a greater proportion of a tooth 4 can be formed from the part tooth 7 of the insert element 8, whereby the strength of the tooth can be adjusted within certain limits.

It should be mentioned at this point that the form of the teeth 4 and part teeth 6, 7 is not considered to be limited by the invention but is rather adjusted to the purpose of the toothed wheel 1. As the different possible tooth forms are known from the prior art they will not be discussed in more detail here.

Thus by means of this embodiment variant of the toothed wheel 1 a so-called "split gear" can be produced that compared to the prior art only comprises two parts. The task of eliminating play in a play-free gear train with at least one further meshing toothed wheel is thus performed by the teeth of the insert element 8.

In order to increase the pretensioning, if necessary the insert element 8 can be arranged to be rotated by a predefinable angle, which is selected for example from a range with a lower limit of 0.05° and an upper limit von 0.5°, so that the part teeth 7 are not aligned with the part teeth 6 of the toothed wheel body. In this way an uneven pitch of the tooth system 3 is formed, i.e. in that the distances between the teeth are of different sizes.

According to another embodiment variant it is also possible that the insert element 8 is secured by an additional spring element, for example a disc spring, which is secured externally to the insert element 8 and is secured in an annular groove of a hub of the toothed wheel body 2 for mounting a shaft. Spring elements of this kind are known from the prior art, for example the above-referenced prior art. The insert element 8 can thus be pressed against the toothed wheel body 2, so that if necessary the adhesion of the insert element 8 to the toothed wheel body 2 can be omitted.

Figure 6:
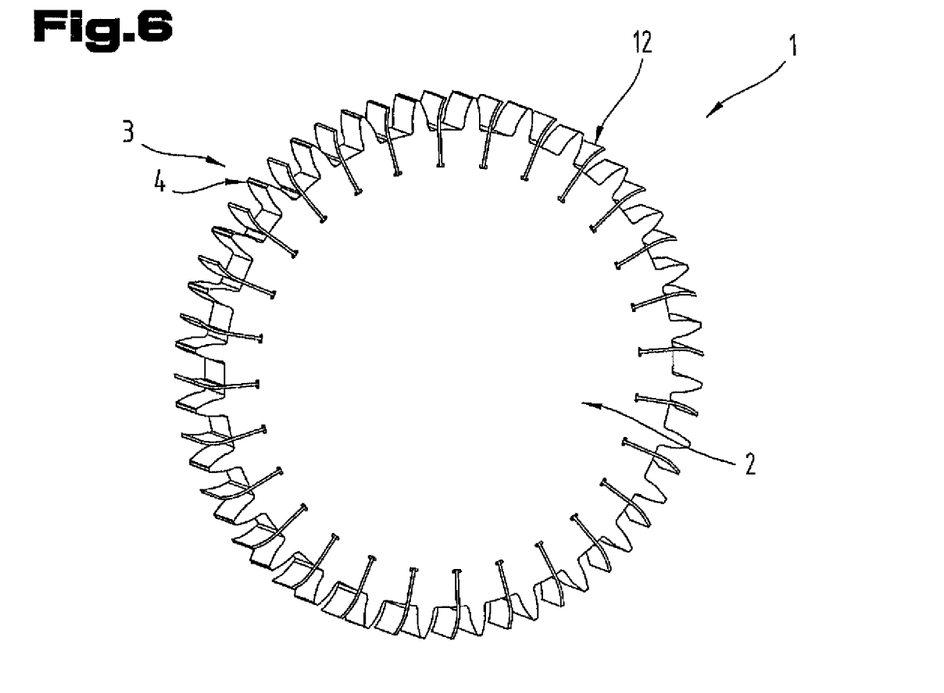
FIG. 6 shows a second embodiment variant of a toothed wheel in oblique view.
Figure 7:
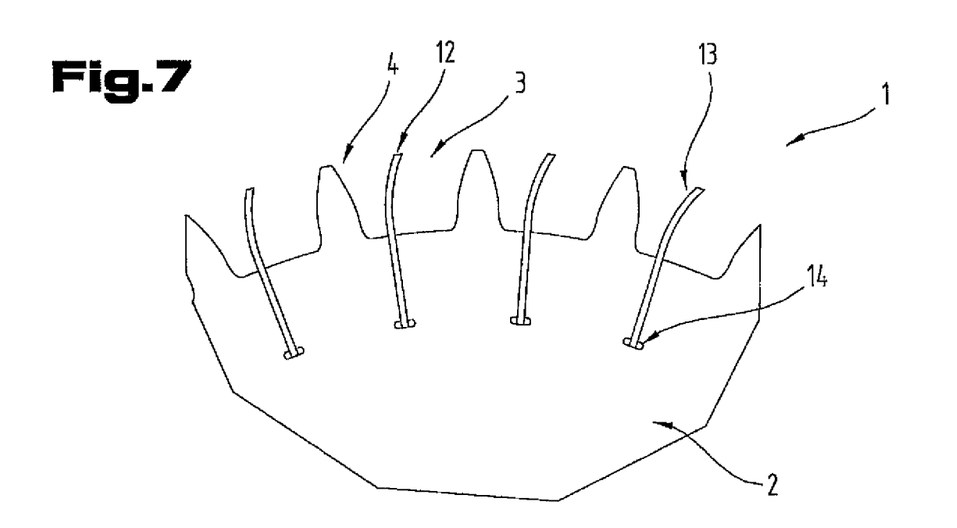
FIG. 7 shows a detail of the toothed wheel according to FIG. 6 in the area of the toothing in oblique view.

FIGS. 6 and 7 show another embodiment variant of the toothed wheel 1. The latter comprises the toothed wheel body 2, which on its radially outer circumference comprises the tooth system 3 with the teeth 4. Said embodiment variant of the toothed wheel 1 is similar to the embodiment described above, in which every second tooth 4 is made at least partly by a tooth 4 or part tooth 7 from a different material. In the present embodiment variant every second tooth 4 is formed by a sheet metal element 12, in particular spring steel. In general every N-th tooth 4 can be made from this sheet metal element 12, wherein N as in all variants of the invention is selected from a range with a lower limit of 2 and an upper limit of X, in particular X/2, wherein X is the total number of teeth 4, i.e. in this case the sum of the number of teeth 4 and the number of sheet metal elements 12. In particular, N in all embodiment variants of the invention can also be selected from a range with a lower limit of 2 and an upper limit of X/4, preferably an upper limit of X/8. Thus every second or every third or every fourth etc. tooth 4 can be made by a tooth of a different material with lower tooth strength or low modulus of elasticity compared to the X−N remaining teeth 4.

In the present embodiment variant of the toothed wheel 1 under discussion a toothed wheel 1 is obtained with a triple covering. The sheet metal element 12 takes over the aforementioned tension for eliminating play.

As also shown in particular in FIG. 7, the sheet metal elements 12 are not central, i.e. the middle of two teeth 4, but are arranged offset by a predefinable value from the center, according to the desired tension and the form of the sheet metal element 12, in particular a bent end section 13 of the sheet metal element, i.e. the extent of the bending. The end sections 13 are inclined opposite the direction of rotation of the installed toothed wheel 1.

The wall thickness of the sheet metal element 12 is also oriented to the desired tensioning with the teeth of the meshing additional toothed wheel and to the spring force of the sheet metal element 12.

The sheet metal elements 12 are preferably secured or anchored respectively in recesses 14 in the toothed wheel body. In principle, it is possible for the sheet metal elements to be placed into a sintering mold, before the powder for the toothed wheel body 2 is inserted; however, they are preferably secured to the toothed wheel body 2 after the production thereof.

In principle, it is also possible to replace said sheet metal elements 12 with elements made of plastic. The use of sheet metal elements 12 is preferred however.

Figure 9:
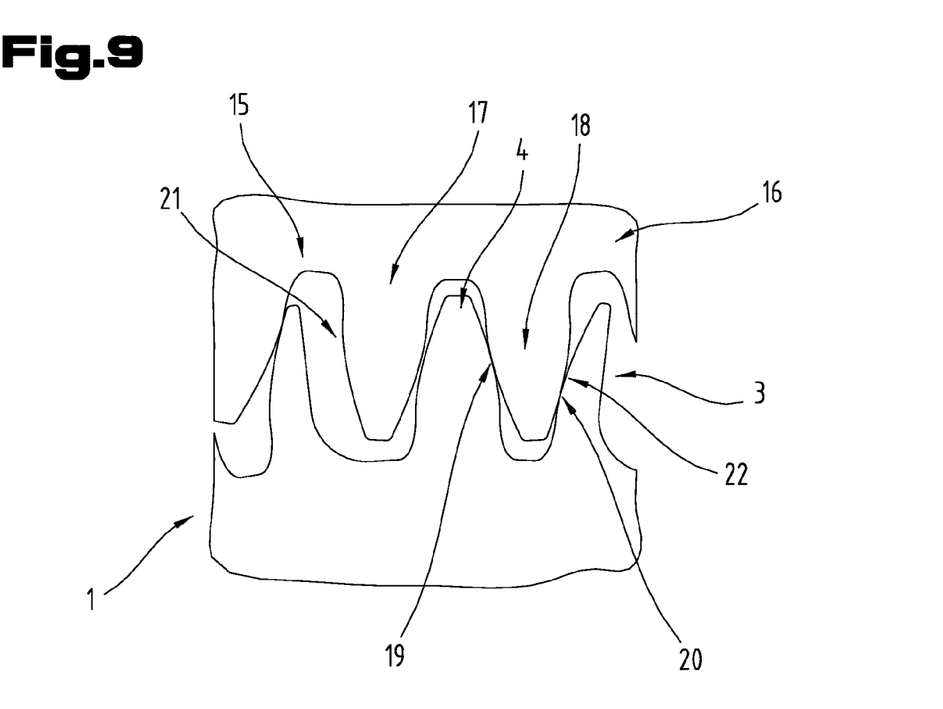
FIG. 9 shows the detail of a gear train in the area of two meshing toothed wheels according to the invention.

FIG. 9 shows a further embodiment variant of the invention. A detail of a play-free gear train 15 is shown in a simplified manner with the toothed wheel 1 and a further toothed wheel 16 in the area of the tooth system 3 with the teeth 4 of the toothed wheel 1, which is in meshing engagement with a tooth system 17 with teeth 18 of the additional toothed wheel 16. The teeth 18 of the additional toothed wheel 16 are all configured to have the same shape. For a better representation every second tooth 4 of the toothed wheel 1 according to the invention has been shown cut in half.

Figure 8:
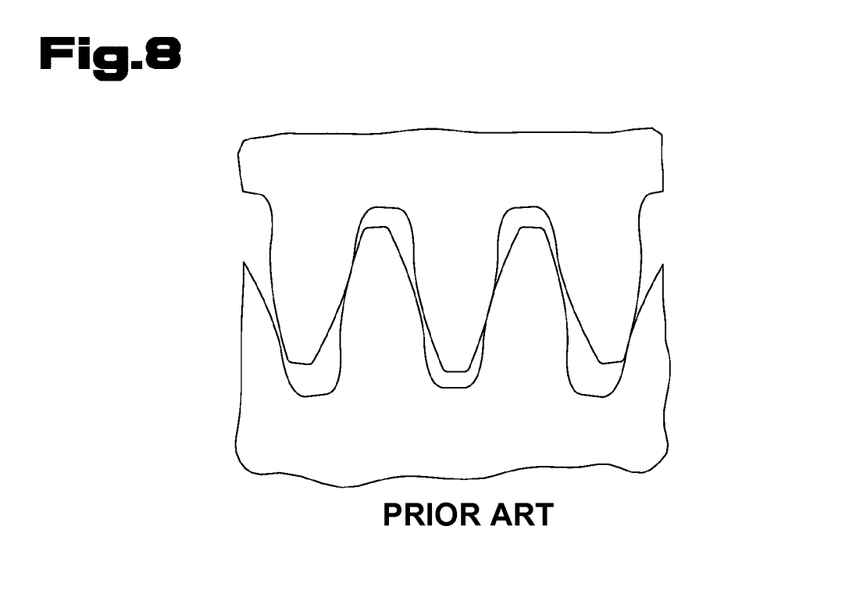
FIG. 8 shows a detail of a gear train in the area of two meshing toothed wheels according to the prior art.

In this embodiment of the toothed wheel 1 every second tooth 4—in this embodiment variant of the toothed wheel 1 not every second tooth 4 is replaced at least partly by a tooth made from a different material—or in general every N-th tooth, is arranged to stand out by a predefinable angle. Said angle can be selected from the above angle range. In this way contact points 19, 20 on a front tooth flank 21 or a rear tooth flank 22—as viewed in the direction of rotation of the toothed wheel 1—or contact areas of a tooth 4 are not in an imaginary common circle—as is the case with the toothed wheel according to the prior art, which is shown in cross-section in FIG. 8—but there are two imaginary circles separated from one another. By means of this tooth geometry which is different from the prior art with an adjusted pitch there is also a reduction or elimination of the torsional flank clearance, whereby the mating gear, i.e. the additional toothed wheel 16, retains its original form.

Figure 10:
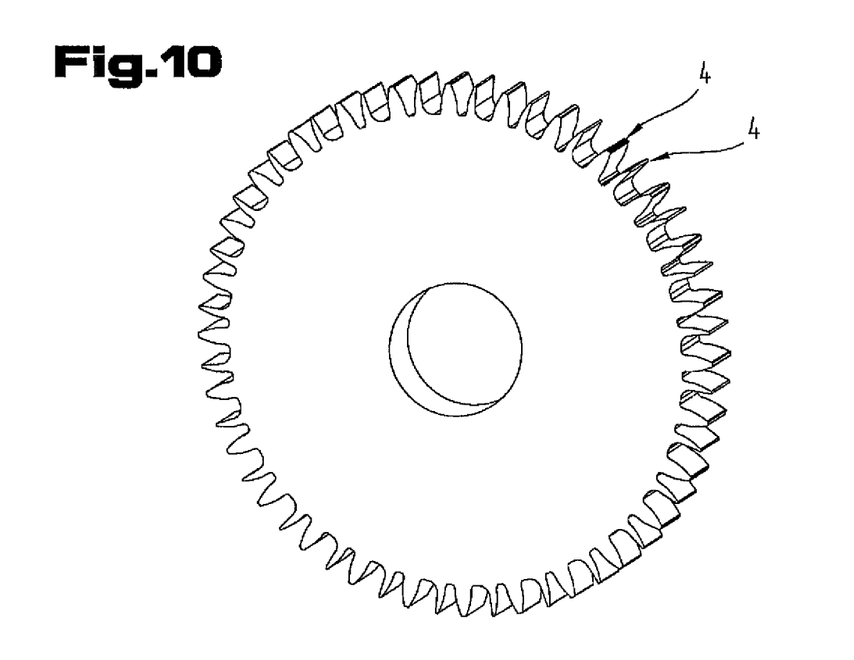
FIG. 10 shows a further embodiment variant of a toothed wheel in oblique view.
Figure 11:
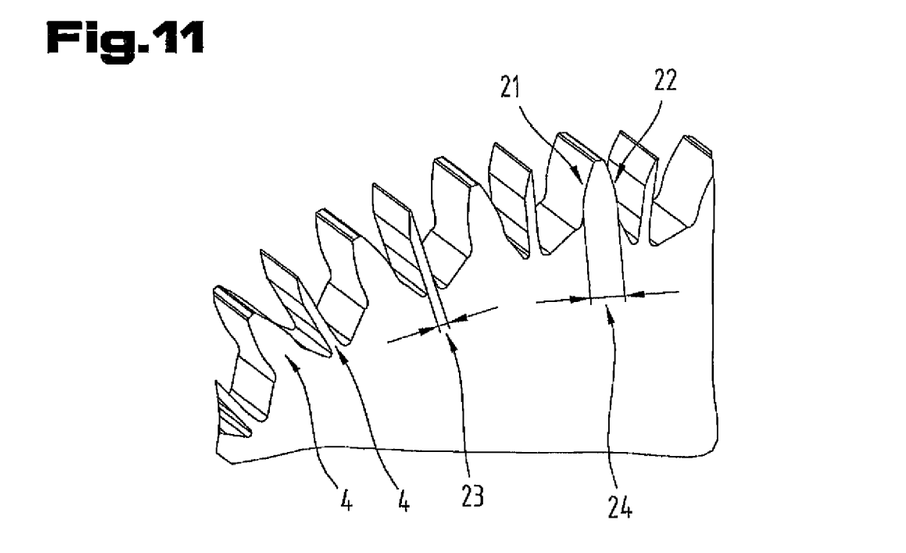
FIG. 11 shows a detail of the toothed wheel according to FIG. 10 in the area of the toothing in oblique view.
Figure 12:
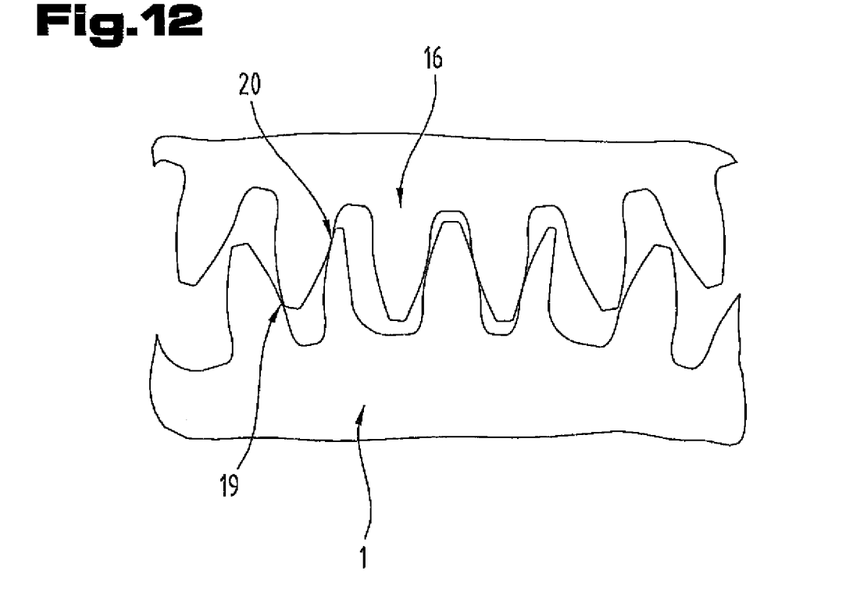
FIG. 12 shows the detail of a gear train in the area of two meshing toothed wheels with a toothed wheel according to FIG. 10.

In one embodiment variant in addition—as shown in FIGS. 10 to 12—every second tooth 4, or generally every N-th tooth 4, compared to the remaining X−N teeth 4 have a maximum tooth width 23, which is smaller as viewed in axial direction than a maximum tooth width 24 of the remaining N−X teeth 4, i.e. every first tooth 4 as viewed in the same direction. The term maximum tooth width 23, 24 refers to the tooth width 23, 24 which on the basis of the tooth form in cross section has the greatest value and which is normally formed in the area between the tooth flanks 21, 22, as shown in FIG. 11. The precise position of the maximum tooth width 23, 24 is thereby dependent on the respective tooth form.

In this embodiment variant all of the teeth 4 are made from the same material, in particular a sintered material. In this way by means of the reduction of the tooth width 23 every N-th tooth 4 influences the tooth rigidity, whereby every N-th tooth 4 has a greater bendability compared to the remaining X−N teeth 4 because of the reduced cross section. The specific example according to FIGS. 10 to 12 shows a toothed wheel 1 with a triple covering. In addition, in this embodiment variant also every N-th tooth can be arranged to stand out as described above.

Every N-th tooth 4 is tensioned at the adjusted axial spacing by the mating gear, i.e. the additional toothed wheel 16, and by means of its elasticity also balances out any possible run-out errors. In this way there is also no torsional flank clearance. The mating gear remains unchanged in this case. The contact points 19, 20 of the teeth 18 of the additional toothed wheel 16 meshing with teeth 4 do not lie on a common imaginary circle, as shown in FIG. 12 and described above.

Figure 13:
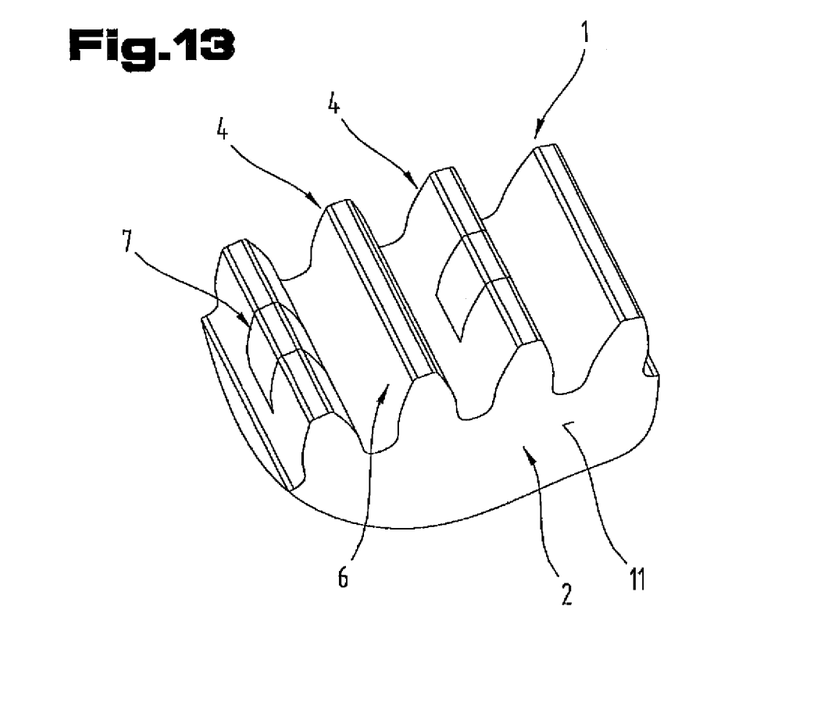
FIG. 13 shows a detail of another embodiment variant of a toothed wheel in oblique view.

FIG. 13 shows an embodiment variant of the toothed wheel 1, which is similar to the one of FIGS. 1 to 5. In this case every second tooth 4 of the toothed wheel body 2 is configured to be slit, wherein the recesses created thereby are filled with a plastic so that every second tooth 4 consists of the part teeth 6, 7. The part teeth 7 can be inserted into the slots as separate elements and connected to the part teeth 6, in particular adhered, or are produced by injecting a plastic mass into the slots, whereby a suitable form can be used which can also be configured so that the part teeth 7 are not aligned—as viewed in axial direction—with the part teeth 6. The non-aligning arrangement can also be achieved with the used separate part teeth 7. This embodiment clarifies that the part teeth 7 need not necessarily be arranged at the end, i.e, beginning at the end face 11 of the toothed wheel body 2.

According to a further embodiment variant of the toothed wheel 1 the tooth system 3 has X teeth 4, wherein a number of M teeth have at least partly a lower tooth rigidity than the remaining X−M teeth, wherein M is selected from a range with a lower limit of 1 and with an upper limit of X−1 or an upper limit of X with the proviso that at least individual teeth are configured to be divided or all of the teeth have a different geometry.

In general, in all of the embodiment variants of the invention at least individual teeth 4 can also be divided in two, so that the teeth 4 only partly have the lower tooth rigidity.

It is also possible according to this embodiment of the toothed wheel 1 that all of the teeth 4 have at least partly different tooth rigidities, for example all of the teeth 4 have a different geometry. It is also possible within the scope of the invention for the toothed wheel 1 to consist of two part toothed wheels, wherein a part toothed wheel is made of plastic or metal or a metal alloy, as explained above. Both part toothed wheels in this embodiment variant have the same number of teeth on which the teeth 4 form the tooth system 3. The two part toothed wheels can for example be adhered together by means of a plug toothing or by means of another suitable connection method.

In addition, also a different number M of teeth 4 can be configured with the lower tooth rigidity. It can be configured with not only a periodically recurring number of teeth 4, as is the case in the embodiment variants with N teeth, but also a non-periodically recurring number of teeth 4 at least partly according to the invention. For example a tooth 4 can be formed with a greater tooth rigidity, the three adjoining teeth 4 can have a lower tooth rigidity, the two teeth 4 adjoining the latter can have a greater tooth rigidity, the tooth adjoining the latter can again have a lower tooth rigidity, etc. Because of the large number of possible combinations the latter are not represented here. Lastly, the configuration of the toothed wheel 1 with the tooth system 3 according to the invention is adapted to the toothing of the toothed wheel meshing with the toothed wheel 1.

Furthermore, for this embodiment variant at least some of the above explanations about the N teeth apply, as described in the claims, so that it is not necessary to repeat this here.

By means of the invention an adjustment can be made via the tooth bending, which is obtained by the tooth rigidity, i.e. the tooth geometry, under a load defined by the respective application of the toothed wheel 1, and/or by means of the modulus of elasticity of the material used, the tensioning of the toothed wheel 1, i.e. the elimination of play can be achieved without an additional spring element, in that the functionality of the spring element is introduced into the teeth 4 of the toothed wheel 1. In this case N, M or all teeth 4 can contribute to the tensioning. Alternatively or additionally to this by means of a rotation of the teeth 4 or part teeth 7 from a material different from the material of the toothed wheel body 2 about a predefinable angle a tooth gap that is smaller on one side can be produced. In this way a certain torque (pretensioning torque) is necessary to bend a tooth. During the loading the tooth can yield, thereby avoiding the jamming of the tooth systems. In the embodiment variant with the sheet metal elements 12 the latter bend during operation, resulting in a pretensioning torque. The tensioning can also be achieved so that there is a small torsional flank clearance. In this way axial spacing tolerances which cause a reduction in the rotational flank clearance are balanced out, as the tooth still has sufficient space in the tooth gap to make way. In this case a tensioning is created which is dependent on the size of the axial displacements.

The exemplary embodiments show possible embodiment variants of the toothed wheel 1, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

List of Reference Numerals 1 toothed wheel
2 toothed wheel body
3 tooth system
4 tooth
5 toothing width 6 part tooth
7 part tooth
8 insert element
9 annular body
10 annular groove
11 end face
12 sheet metal element
13 end section
14 recess
15 gear train
16 toothed wheel
17 tooth system
18 tooth
19 contact point
20 contact point
21 tooth flank
22 tooth flank
23 tooth width
24 tooth width

The invention claimed is:

1. A toothed wheel comprising a toothed wheel body with a tooth system consisting of a sequence of teeth, wherein the total number of teeth has the value X, every N-th tooth having at least partly a lower tooth rigidity than the remaining X−X/N teeth, N being a number which is selected from a range with a lower limit of 2 and an upper limit of X, wherein every N-th tooth is formed of a first material and is configured to be shorter in axial direction than the remaining X−X/N teeth and a gap which is created by the shortened teeth in axial direction over the path of the teeth is filled at least partly with a second material in the form of a tooth profile of the teeth, so that every N-th tooth is composed of a first part tooth and a second part tooth, wherein the second part teeth are formed from a material different than the material of the remaining X−X/N teeth and form a common insert element, wherein said insert element is connected to the toothed wheel body.

2. The toothed wheel as claimed in claim 1, wherein the first material has a modulus of elasticity which is lower than the material of the remaining X−X/N teeth.

3. The toothed wheel as claimed in claim 1, wherein a maximum tooth width of each N-th tooth, viewed in axial direction, is smaller than a maximum tooth width of the remaining X−X/N teeth in the same direction.

4. The toothed wheel as claimed in claim 1, wherein the second part teeth are made from a plastic.

5. The toothed wheel as claimed in claim 1, wherein the toothed wheel body in an end face comprises a groove and the insert element is arranged at least partly in the groove.

6. The toothed wheel as claimed in claim 1, wherein the teeth of the insert element are arranged offset relative to the X−X/N teeth of the tooth system of the toothed wheel body thereby forming an uneven pitch.

7. The toothed wheel as claimed in claim 1, wherein every N-th tooth has a tooth geometry that is different from the remaining X−X/N teeth.

8. The toothed wheel as claimed in claim 1, wherein the insert element is configured in one piece.

9. The toothed wheel as claimed in claim 1, wherein the insert element is injected onto the toothed wheel body.

10. The toothed wheel as claimed in claim 1, wherein the insert element comprises an annular body on the outer circumference of which the second part teeth are arranged, wherein the second part teeth have a greater thickness in axial direction than the annular body.

11. The toothed wheel as claimed in claim 1, wherein the insert element is arranged rotated about a predefinable angle so that the second part teeth are not in alignment with the first part teeth of the toothed wheel body.

12. A play-free gear train comprising at least two toothed wheels meshing with one another, wherein one of the toothed wheels is configured as claimed in claim 1.

13. The toothed wheel according to claim 1, wherein N=X/2.

14. A toothed wheel comprising a toothed wheel body with a tooth system consisting of a sequence of teeth, wherein every second or every third or every fourth tooth has at least partly a lower tooth rigidity than the remaining teeth, wherein every second or every third or every fourth tooth is formed of a first material and is configured to be shorter in axial direction than the remaining teeth, and a gap which is created by the shortened teeth in axial direction over the path of the teeth is filled at least partly with a second material in the form of a tooth profile of the teeth, so that every second or every third or every fourth tooth is composed of a first part tooth and a second part tooth, wherein the second part teeth are formed from a material different than the material of the remaining teeth and form a common insert element, and wherein said insert element is connected to the toothed wheel body.

* * * * *